US009361642B1

(12) United States Patent
Burton et al.

(10) Patent No.: US 9,361,642 B1
(45) Date of Patent: Jun. 7, 2016

(54) PRODUCT EVALUATION SYSTEM FEATURING USER CONTEXT ANALYSIS

(71) Applicant: International Business Machines Corporation, Armonk, NY (US)

(72) Inventors: Peter H. Burton, Vancouver (CA); Donna K. Byron, Petersham, MA (US); Manvendra Gupta, Brampton (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/954,252

(22) Filed: Nov. 30, 2015

(51) Int. Cl.
G06F 17/30 (2006.01)
G06Q 30/02 (2012.01)
G06Q 30/06 (2012.01)

(52) U.S. Cl.
CPC ...... *G06Q 30/0629* (2013.01); *G06F 17/30528* (2013.01); *G06Q 30/0627* (2013.01)

(58) Field of Classification Search
CPC ............. G06F 17/30424; G06F 17/30657; G06Q 30/02; G06Q 30/0202; G06Q 30/023; G06Q 30/0224; G06Q 30/0631
See application file for complete search history.

(56) References Cited

U.S. PATENT DOCUMENTS

| | | | | |
|---|---|---|---|---|
| 7,107,226 B1* | 9/2006 | Cassidy | ............. | G06Q 30/0625 705/26.62 |
| 8,200,687 B2* | 6/2012 | Gupta | ............... | G06F 17/30867 707/737 |
| 8,249,915 B2* | 8/2012 | Iams | ................. | G06F 17/30699 705/26.7 |
| 8,744,896 B2 | 6/2014 | Tellis et al. | | |
| 8,781,917 B2* | 7/2014 | Westphal | ............... | G06Q 30/02 705/26.7 |
| 2006/0277103 A1* | 12/2006 | Fujita | ..................... | G06Q 30/02 705/14.53 |
| 2009/0063247 A1 | 3/2009 | Burgess et al. | | |
| 2009/0083096 A1 | 3/2009 | Cao et al. | | |
| 2012/0030020 A1* | 2/2012 | Bucak | ..................... | G06Q 30/02 705/14.53 |
| 2013/0066873 A1 | 3/2013 | Salvetti et al. | | |
| 2014/0207518 A1* | 7/2014 | Kannan | .............. | G06Q 30/0201 705/7.29 |

OTHER PUBLICATIONS

CPC Version 1.1, "Central Product Classification," updated Feb. 2002, 840 pages, Version submitted to the United Nations Statistical Commission on Mar. 5-8, 2002. ESA/STAT/SER.M/77/Ver.1.1.
UNSPSC, The United Nations Standard Products and Services Code Welcome page, retrieved from http://www.unspsc.org on May 5, 2015, 2 pages.

* cited by examiner

*Primary Examiner* — Cheryl Lewis
(74) *Attorney, Agent, or Firm* — Hoffman Warnick LLC

(57) ABSTRACT

A system, method and program product that provides product evaluations. A system is disclosed that includes: a system for identifying a set of products based on an inputted query; a system for collecting structured and unstructured data associated with the set of products; a system for generating a composite feature list from the structured and unstructured data; a system for generating a matrix for each identified product, wherein the matrix provides a set of features and any known limitations and benefits determined from the structured and unstructured data for each of the features; and a rating system that analyzes a usage context in view of the known limitations and benefits to evaluate each product at a feature level.

20 Claims, 4 Drawing Sheets

BABY MONITOR COMPOSITE FEATURE MATRIX 52

| FEATURE | ATTRIBUTE | USAGE LIMITATIONS & BENEFITS | FEEDBACK |
|---|---|---|---|
| Video | Picture Quality / Size | | |
| Power Supply | AC / DC | | |
| Rechargeable Battery | Charge Duration | | |
| Wireless Monitor | Wireless Range | | |
| Phone Connector | Wired Option | | |
| Size | Portability | | |
| Style | Color, etc. | | |

Figure 2

BABY MONITOR XYZ MODEL MATRIX 54

| FEATURE 56 | ATTRIBUTE 58 | USAGE LIMITATIONS & BENEFITS 60 | FEEDBACK 62 |
|---|---|---|---|
| Video | Picture Quality / Size = 4" | | Positive |
| Power Supply | AC / DC | 110/220 US outlet | Positive |
| Rechargeable Battery | Charge Duration = 12 hours | | Negative |
| Wireless Monitor | Wireless Range = 25 meters | (a) Interferes with 802 11(n) (b) Limited by cement walls | Negative |
| Phone Connector | Wired Option (N/A) | Not available | Negative |
| Size | Portability Dimensions = 6"x10" | Carrying case included | Positive |
| Style | Color, etc. | Pink, Blue | Positive |

Figure 3

PRODUCT EVALUATION SYSTEM FEATURING USER CONTEXT ANALYSIS

TECHNICAL FIELD

The subject matter of this invention relates to product evaluation tools, and more particularly relates to a product evaluation system and method that utilizes feature or attribute level processing and user context analysis.

BACKGROUND

Modern products come with a shocking and every-increasing array of features as producers seek to differentiate their products. This is not only true for consumer goods such as electronics, and home products but also for information products such as banking, insurance, and software offerings. To help users with evaluating competing products, there exist numerous online evaluation services, including ratings engines, review websites, shopping platforms, search facilities, on-line spec sheets, etc.

While such online services provide a tremendous amount of information for the consumer to evaluate competing products within a given category, a significant amount of time and effort is often required to perform such an evaluation. For instance, comparing products can be difficult when different ratings engines or product spec sheets evaluate non-overlapping sets of features. Additionally, some features may only be mentioned in the natural-language text of a review, which requires the user to read many reviews to cull out relevant information.

Furthermore, a given product may have some inherent limitation specific to the user that the user would not have thought of when searching for information, and which would not surface through normal searching/querying about the product.

Moreover, it is currently difficult to identify cross-domain dependencies or interferences of one product with another. For example, product A (e.g., a particular television) may work fine with product B (a particular DVD player), but not work so well with product C (a particular Blu-ray player). In this scenario, such information would be extremely useful for the consumer, but is not readily available.

An additional challenge is that there may be personal attributes, beyond sides the features mentioned within a shopping/ratings website or the producer's spec sheets that cause one particular feature to be a benefit or deal-breaker for a particular shopper. For example, a particular model beach chair may be fine for a petite woman, but not a good selection for a large man.

Given the number of products available in many arenas of life, this kind of complex, contextualized comparison and evaluation is becoming more and more complicated for consumers.

SUMMARY

The present disclosure provides a product evaluation system and method that utilizes attribute level processing and user context analysis to evaluate products within a category of products.

A first aspect provides a product evaluation system, comprising: a system for identifying a set of products based on an inputted query; a system for collecting structured and unstructured data associated with the set of products; a system for generating a composite feature list from the structured and unstructured data; a system for generating a matrix for each identified product, wherein the matrix provides a set of features and any known limitations and benefits determined from the structured and unstructured data for each of the features; and a rating system that analyzes a usage context in view of the known limitations and benefits to evaluate each product at a feature level.

A second aspect provides a computer program product stored on computer readable storage medium, which when executed by a computer system, provides product evaluation system, comprising: program instructions for identifying a set of products based on an inputted query; program instructions for collecting structured and unstructured data associated with the set of products; program instructions for generating a composite feature list from the structured and unstructured data; program instructions for generating a matrix for each identified product, wherein the matrix provides a set of features and any known limitations and benefits determined from the structured and unstructured data for each of the features; and program instructions that analyzes a usage context in view of the known limitations and benefits to evaluate compatibility of each product at a feature level.

A third aspect provides a method for providing product evaluations, comprising: identifying a set of products based on an inputted query; collecting structured and unstructured data associated with the set of products; generating a composite feature list from the structured and unstructured data; generating a matrix for each identified product, wherein the matrix provides a set of features and any known limitations and benefits determined from the structured and unstructured data for each of the features; and rating each product by analyzing a usage context in view of the known limitations and benefits to evaluate compatibility of each product at a feature level.

BRIEF DESCRIPTION OF THE DRAWINGS

These and other features of this invention will be more readily understood from the following detailed description of the various aspects of the invention taken in conjunction with the accompanying drawings in which:

FIG. 2 shows a composite feature matrix for a product category according to embodiments.

FIG. 3 shows a model specific feature matrix according to embodiments.

Figure 1:
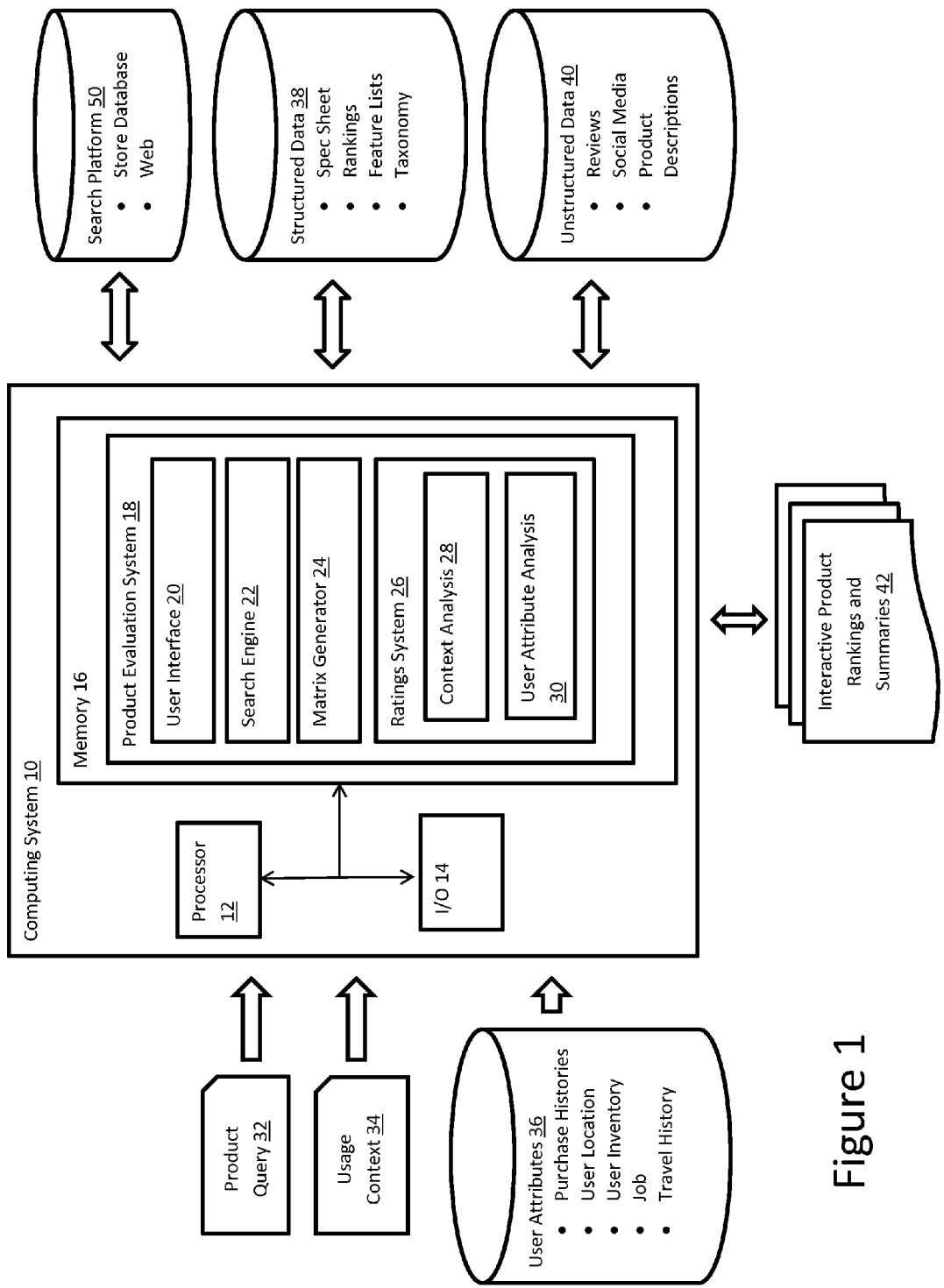
FIG. 1 shows a computing system having a product evaluation system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a product evaluation system 18 that evaluates a set of products identified based on a submitted product query 32. Matching products may be identified, e.g., in response to an inputted search, as a result of website navigation, user interface selections, dropdown boxes, etc. In one illustrative embodiment, product evaluation system 18 may provide product evaluations in the form of a ranked or rated set of interactive results 42, such that the best matching product is listed first, and so on. As described in further detail herein, ratings are based on analysis of a usage context 34 and relevant user attributes 36 being applied at the product feature level. In this manner, the best matching or most compatible products are identified for the user.

Usage context 34 generally comprises information regarding how the user intends on using the product being search. For example, if the user is searching for a new TV, the user might enter a product query 32 such as "42 inch smart TV" into a search facility in user interface 20. Usage context 34 comprises additional information about how the TV is going to be used, and may be collected in any manner. In one illustrative embodiment, the user may be prompted to enter a usage context 34, e.g., via a natural language (NL) dialog, via dropdown boxes, etc. In the example above, the user might enter text in a dialog box or use a voice recognition tool, e.g., "I plan on using the TV in my bedroom, mostly at nighttime to watch news." User interface 20 may further provide an interactive interface that automatically queries the user for addition usage context 34, e.g., "do you plan on utilizing a surround sound system?" "Do you own any other TVs?" etc.

Also made available to product evaluation system 18 are user attributes 36, which generally comprise a stored set of static information about the user, such as purchase histories (i.e., what has the user purchased before and when), user location (i.e., where does the user live), user inventory (i.e., what does the user own, e.g., type of car, electronic equipment, type of house or apartment, internet/phone/cable, computers, software, financial products, etc.), job, travel history, etc. This information may be collected and stored in any manner, e.g., populated by the user, collected from the Internet of Things, etc.

In one illustrative embodiment, once the user enters the product query 32, search engine 22 identifies a set of matching products from a search platform 50, e.g., from a store's database, from the Web, from an online mall, etc., using known techniques. In addition, search engine 22 also identifies and collects structured data 38 and unstructured data 40 associated with the product being searched. Structured data 38 may for example include spec sheets associated with located products, product rankings, feature lists, taxonomies associated with the product, etc. Unstructured data 40 may for example include reviews, social media commentary, product descriptions, blogs, advertising, etc.

From this set of information collected from search engine 22, a matrix generator 24 is utilized to generate a composite set (i.e., superset) of features that are, e.g., loaded into a composite feature matrix for the product category being searched. For example, as shown in FIG. 2, a composite feature matrix 52 is generated to include all of the identified features associated with a product category, in this case, "Baby Monitors." In this example, composite feature matrix 52 is generated as a template to be used for each located product, and includes all of the identified features associated with baby monitors. Features may be discovered from any number of sources. For example, a spec sheet associated with a first product model may list four features, while the spec sheet for a second product model may list two additional features, while information extracted from unstructured data may provide one additional feature. Accordingly, matrix generator 24 attempts to provide a superset of features from as many sources as possible.

The composite matrix 52 is then used as a template for each unique product identified by the search. Note that the term "matrix" is used to mean any type of data structure for holding information, and need not literally be implemented as a matrix, e.g., it may comprise a database, an array, an XML file, etc. Furthermore, composite matrices for different product categories need not be generated dynamically each time a user searches a category, but instead could be saved, e.g., in a cache or other memory, and updated periodically.

In addition, matrix generator 24 may link one or more attribute classes to each feature in the composite matrix 52. For example, based on structured and unstructured data, the "video" feature for the baby monitor is linked to a "picture quality or size attribute class," the power supply is assigned to a power type attribute class (e.g., AC and/or DC), etc. In some cases, a given feature may have more than one attribute classes associated with it. In this case, additional entries may be incorporated into the composite matrix.

Thus, either the individual features themselves or resulting attribute classes can be evaluated to best match products with the user. Thus, as opposed to evaluating or rating the overall product, product evaluation system allows each unique feature or attribute class of a given product to be individually rated.

Once a composite matrix 52 is generated or obtained for a particular product category being searched, instances of the matrix (i.e., a set of model matrices) are filled in for each unique product identified from the search (or, alternatively, the top n search results). For example, if the search resulted in 25 product matches, 25 product model matrices would be populated. FIG. 3 depicts an example of filled in model matrix 54 for a particular baby monitor model XYZ. In the example, attribute data 58 may be added to the attribute classes, e.g., video picture size=4"; charge duration=12 hours; and wireless range=25 meters, which are shown in the example model matrix 54 of FIG. 3. The attribute data 58 may be derived from any source, e.g., a spec sheet, NL processing, etc.

In the next column, usage limitations and benefits 60 are populated for each feature, where applicable. Usage limitations and benefits 60 refer to ascertained limitations, requirements, interactions, problems, issues, benefits, advantages, etc., of each feature or attribute associated with the presented model, e.g., determined from NL processing of user reviews, etc. For example, FIG. 3 shows that some of the features of the XYZ model include ascertained usage limitations and benefits 60, e.g., power supply requirements, wireless monitor limitations, lack of phone connector options, carrying case included, and color options.

In the final column of the matrix 54, feedback 62 is provided for each feature. Feedback 62 may be obtained from online user feedback and reviews, and in this case is presented as a negative or positive indicator. However, a numeric or star ranking could similarly be used.

Once each model matrix 54 is populated, ratings system 26 is utilized to rate or otherwise determine the best matching products for the user. To achieve this, rating system 26 utilizes a context analysis process 28 that analyzes the usage context 34 associated with the product query 32 to determine whether the product features are compatible with the usage context 34. For instance, if the usage context 34 indicates that a user searching for a TV primarily plans on using the TV to watch streaming movies in a surround sound environment, then features such as video quality and wireless Internet performance would be of high importance. Conversely, audio quality may be of a low priority since surround sound equipment will be primary used for the audio output. This information could for example be determined from a knowledge map in which inputted words are associated key terms, e.g., streaming={Internet, router, wireless, etc}.

In one illustrative embodiment, context analysis 28 generates a set of context elements based on the inputted usage context 34. For instance, in the above, context elements may be captured in an XML file as:

```
<Product Type>=TV
    <size>=42
    <key usage elements>
        <requirement.1>=smart TV
        <requirement.2>=Wireless Internet
        <requirement.3>=Surround Sound connectability
    <Unimportant usage elements>
        <feature.1>=audio
```

The context elements are then compared to usage limitations and benefits 60 and/or feedback 62 to determine, on a feature by feature basis, whether the usage elements are compatible with the features, i.e., how closely the product matches the usage context 34 required by the user. In one illustrative embodiment, points can be awarded or deducted based on compatibility. For example, if a particular TV had a limitation with regard to its wireless Internet capabilities, then that feature could be assigned a low compatibility score (e.g., −5 points). Conversely, if the TV was known to easily connect with most surround sound systems, then that feature could be assigned a high compatibility score (e.g., +5 points).

In addition to evaluating usage context 34, user attribute analysis 30 may be provided to evaluate user attributes 36 that might be relevant to the rating analysis. For instance, if is known what type of surround sound system or wireless router the user already owns, it might be possible to determine how compatible the TV is with each. In another example, it might be determined that a particular product a user is intending to pick up at a store has a size attribute that will not allow it to fit into the user's car. Accordingly, any such features or attributes can then be assigned a further compatibility score (e.g., +/−points) by the rating system 26.

Rating system 26 may thus use a multi-layered approach to rating and ranking products. For instance, rating system 26 may perform a first pass that provide a "base" rating using traditional scoring, e.g., based on overall product feedback scoring (e.g., 1-5 stars, wherein each star=10 points). Next, rating system 26 may then evaluate each product at the feature or attribute level, and apply any feature level compatibility scores to adjust the rating score up or down based on the context analysis 28 and user attribute analysis 30. For example, if some of the features of a highly ranked model had low compatibility scores (e.g., −5 points), then the rating of that model would be reduced. Additionally, points could be awarded or reduced based on feedback 62 associated with highly relevant features. For instance, if it was determined through usage context 34 that the ease of use with a smart TV interface was important, and it received a negative feedback, then the compatibility score for that feature could be reduced (e.g., −3 points). Feature based compatibility scores could be tallied and added to the original based rating to provide a final value. Note however that any rating algorithm could be employed by the rating system 26 to identify the best matching products for the consumer.

As noted in FIG. 1, the output may be in the form of interactive product rankings and summaries 42, which for example, allows the user to interact with each product matrix at the feature or attribute level. For example, the user could click on a listed usage limitation and benefit 60 (FIG. 3), and allow the system to filter and find all of the products that have the limitation or benefit in common.

Figure 4:
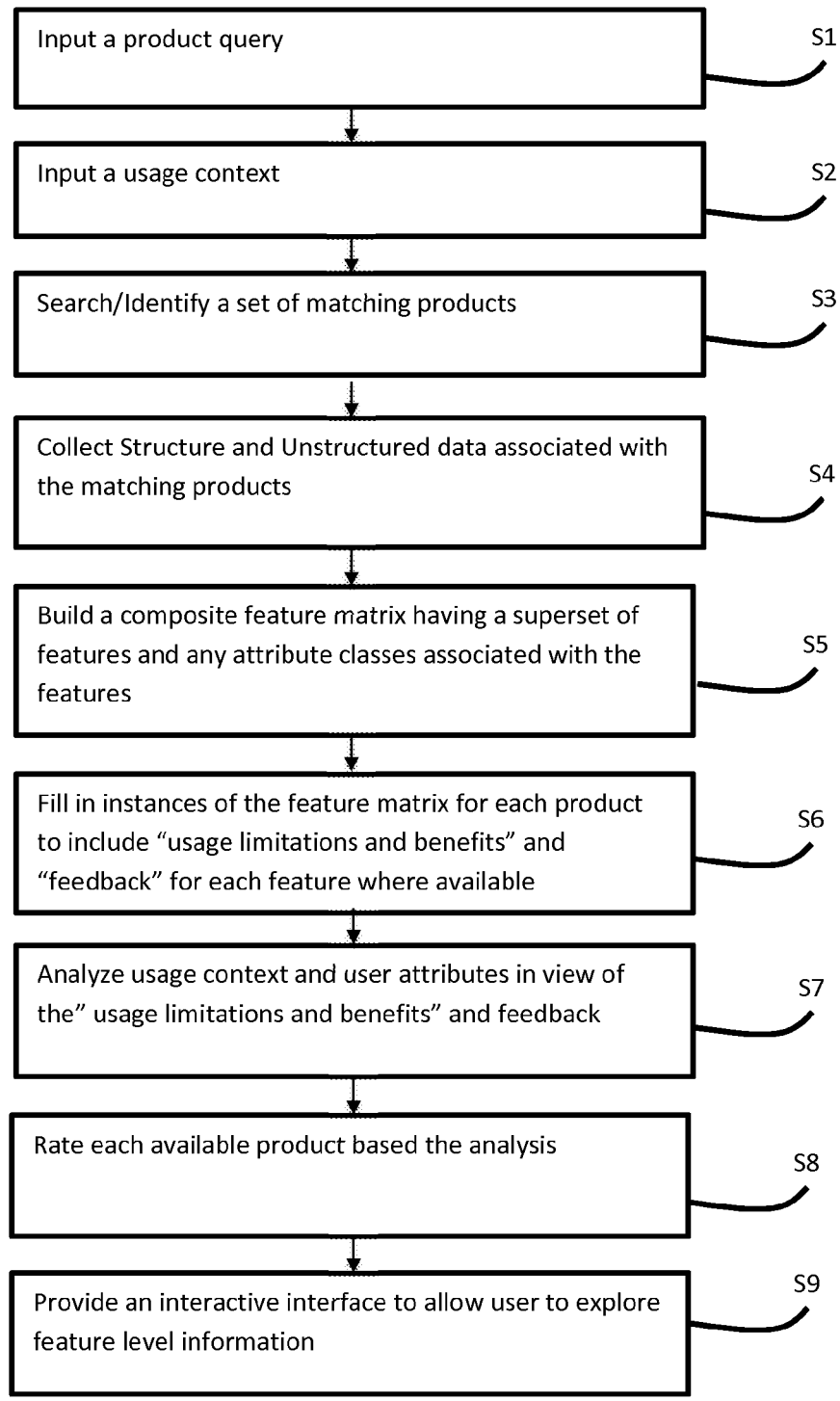
FIG. 4 depicts a flow diagram of method of performing product evaluation according to embodiments.

FIG. 4 depicts a flow diagram of a method of implementing a product evaluation process. At S1, a product query is inputted and at S2 a usage context is inputted. At S3, a set of available or matching products are identified from the product query and at S4, structured and unstructured data associated with the matching products are collected. At S5, a composite feature matrix is build that includes a superset of product features and any associated attribute classes associated with each feature. Next, at S6, for each matching product, an instance of the feature matrix is filled in to include "usage limitations and benefits" as well as "feedback" for each individual feature or attribute class.

At S7, usage context and user attributes are analyzed in view of the "usage limitations and benefits" and "feedback" at the feature or attribute level. Based on the analysis, each matching product is rated to determine how well it matches the user's requirements at S8. Finally, at S9, an interactive interface may be provided to the allow the user to further explore feature level information.

Product evaluation system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiberoptic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative computing system 10 that may comprise any type of computing device and, and for example includes at least one processor 12, memory 16, an input/output (I/O) 14 (e.g., one or more I/O interfaces and/or devices), and a communications pathway. In general, processor(s) 12 execute program code which is at least partially fixed in memory 16. While executing program code, processor(s) 12 can process data, which can result in reading and/or writing transformed data from/to memory and/or I/O 14 for further processing. The pathway provides a communications link between each of the components in computing system 10. I/O 14 can comprise one or more human I/O devices, which enable a user to interact with computing system 10.

Furthermore, it is understood that the product evaluation system and/or relevant components thereof may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A product evaluation system having a memory and processor, comprising:
    a system for identifying a set of products based on an inputted query;
    a system for collecting structured and unstructured data associated with the set of products;
    a system for generating a composite feature list from the structured and unstructured data;
    a system for generating a matrix for each identified product, wherein the matrix provides a set of features and any known limitations and benefits determined from the structured and unstructured data for each of the features; and
    a rating system that analyzes a usage context in view of the known limitations and benefits to evaluate each product at a feature level, and provides interactive rankings and summaries.

2. The system of claim 1, wherein the matrix for each product includes a feedback score for each feature.

3. The system of claim 1, wherein each feature includes at least one attribute class.

4. The system of claim 1, wherein the usage context includes a set of usage elements that are compared to the limitations and benefits to determine whether each usage element is compatible with an associated feature to generate compatibility score.

5. The system of claim 4, wherein the set of usage elements are compared to feedback associated with individual features to determine whether each usage element is compatible.

6. The system of claim 1, wherein the rating system further analyzes user attributes in view of the known limitations and benefits.

7. The system of claim 1, further comprising an interactive interface for allowing a user to filter data based on entries in the matrix.

8. A computer program product stored on non-transitory computer readable storage medium, which when executed by a computer system having a memory and processor, provides product evaluation system, comprising:
   program instructions for identifying a set of products based on an inputted query;
   program instructions for collecting structured and unstructured data associated with the set of products;
   program instructions for generating a composite feature list from the structured and unstructured data;
   program instructions for generating a matrix for each identified product, wherein the matrix provides a set of features and any known limitations and benefits determined from the structured and unstructured data for each of the features; and
   program instructions that analyzes a usage context in view of the known limitations and benefits to evaluate compatibility of each product at a feature level, and generates interactive rankings and summaries.

9. The program product of claim 8, wherein the matrix for each product includes a feedback score for each feature.

10. The program product of claim 8, wherein each feature includes at least one attribute class.

11. The program product of claim 8, wherein the usage context includes a set of usage elements that are compared to the limitations and benefits to determine whether each usage element is compatible with an associated feature to generate compatibility score.

12. The program product of claim 8, wherein the set of usage elements are compared to feedback associated with individual features to determine whether each usage element is compatible.

13. The program product of claim 12, further comprising program instructions that analyzes user attributes in view of the known limitations and benefits.

14. The program product of claim 8, further comprising program instructions to provide an interactive interface for allowing a user to filter data based on entries in the matrix.

15. A method performed on a computing system having a memory and processor for providing product evaluations, comprising:
   identifying a set of products based on an inputted query;
   collecting structured and unstructured data associated with the set of products;
   generating a composite feature list from the structured and unstructured data;
   generating a matrix for each identified product, wherein the matrix provides a set of features and any known limitations and benefits determined from the structured and unstructured data for each of the features;
   rating each product by analyzing a usage context in view of the known limitations and benefits to evaluate compatibility of each product at a feature level; and
   outputting interactive rankings and summaries.

16. The method of claim 15, wherein the matrix for each product includes a feedback score for each feature.

17. The method of claim 15, wherein each feature includes at least one attribute class.

18. The method of claim 15, wherein the usage context includes a set of usage elements that are compared to the limitations and benefits to determine whether each usage element is compatible with an associated feature to generate compatibility score.

19. The method of claim 15, wherein the set of usage elements are compared to feedback associated with individual features to determine whether each usage element is compatible.

20. The method of claim 19, wherein the rating further analyzes user attributes in view of the known limitations and benefits.

\* \* \* \* \*